Sept. 15, 1959      W. H. RATMEYER      2,904,219
MAGNETICALLY CONTROLLED SEED PLANTER
Filed April 26, 1957      2 Sheets-Sheet 1
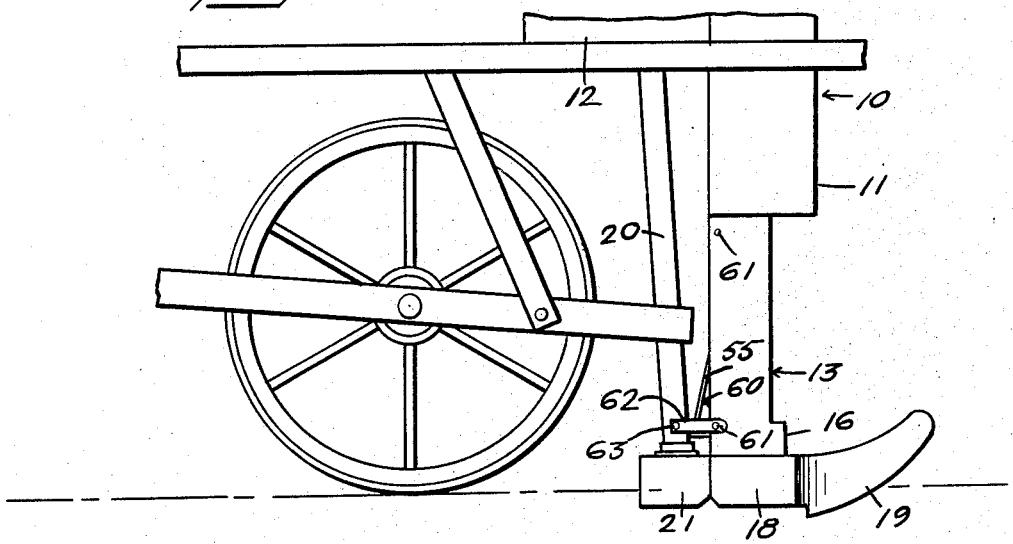
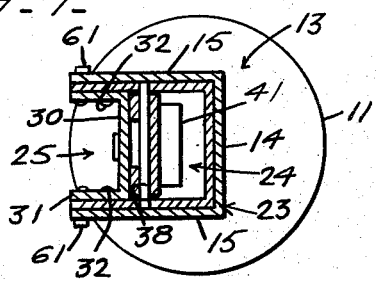 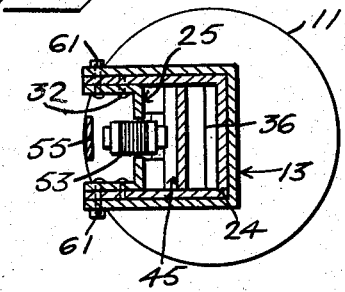
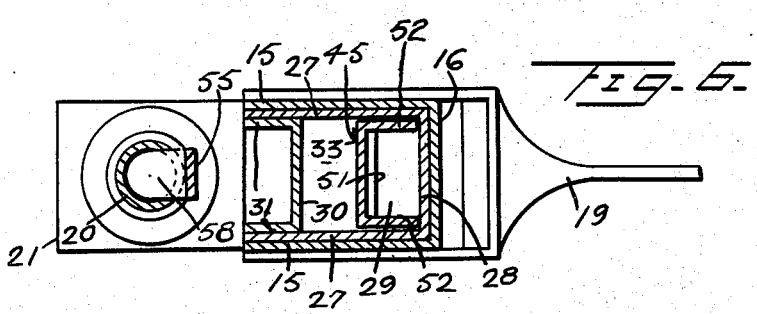
INVENTOR
Walter H. Ratmeyer
BY
ATTORNEY

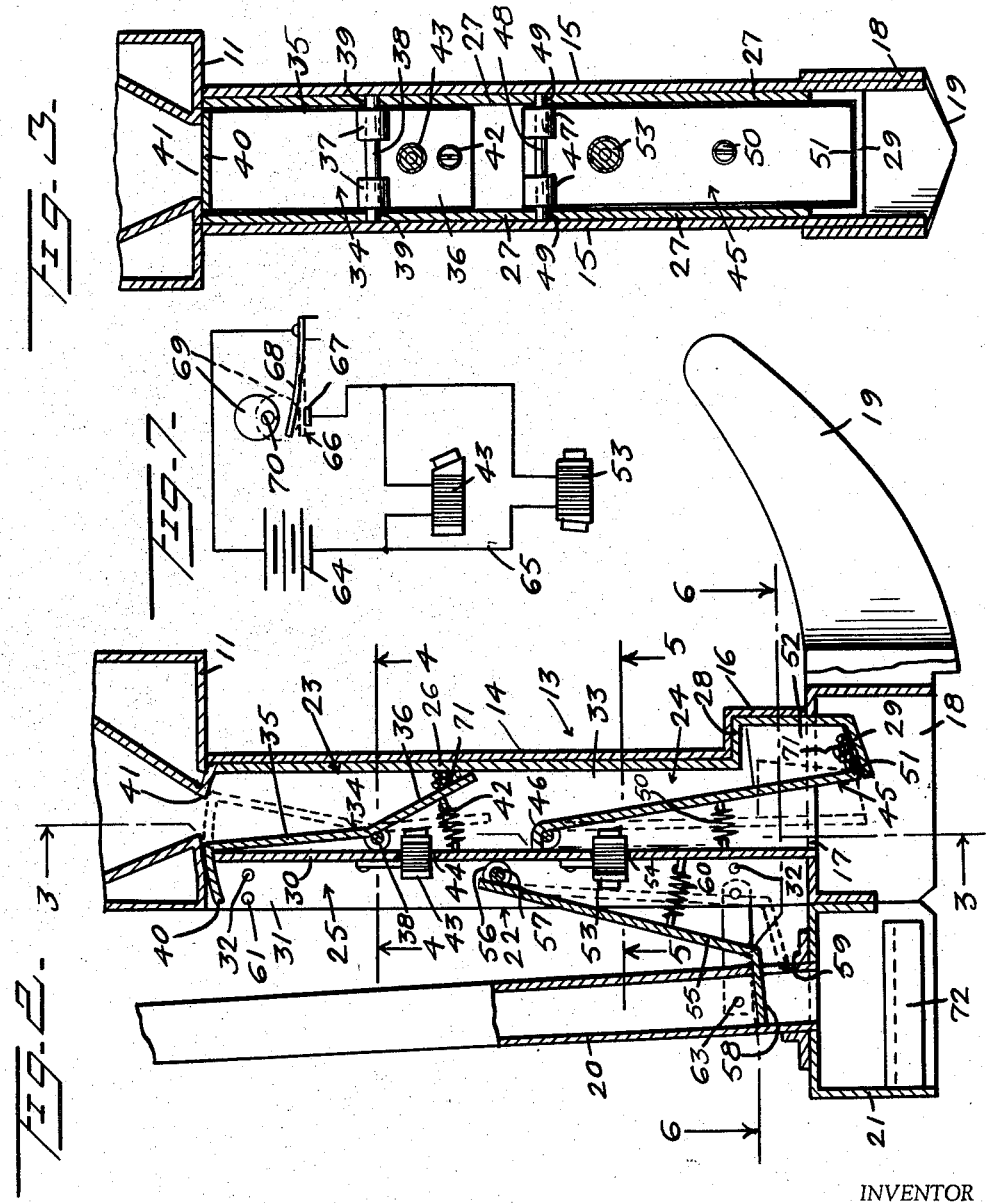

United States Patent Office 2,904,219
Patented Sept. 15, 1959

2,904,219

MAGNETICALLY CONTROLLED SEED PLANTER

Walter H. Ratmeyer, Forreston, Ill.

Application April 26, 1957, Serial No. 655,311

2 Claims. (Cl. 222—76)

This invention relates to a seed planter, such as a corn planter, including means which are in part magnetically operated for controlling the discharge of the seed from the planter, and by means of which such control means may be materially simplified over conventional mechanism of the type at present employed for regulating the discharge of seed from planters.

More particularly, it is an object of the present invention to provide a control mechanism for a planter which may be operated at a very high speed, where desired, which will be extremely accurate in reference to the amount of seed which is dispensed on each discharge of the seed from the planter, and which will also be extremely accurate with reference to the spacing of the seed.

A further object of the invention is to provide an improved planter control mechanism which may be easily serviced and which is capable of being quickly and easily applied to or removed from a planter standard as a unit.

Various other objects and advantages of the invention will hereinafter become more fully apparent from the following description of the drawings, illustrating a presently preferred embodiment thereof, and wherein:

Figure 1 is a side elevational view of a portion of a seed planter shown equipped with the magnetic control;

Figure 2 is an enlarged fragmentary vertical sectional view of a portion of the planter, shown partly in elevation, and showing the magnetic unit in an applied position;

Figure 3 is a transverse vertical sectional view taken substantially along the line 3—3 of Figure 2;

Figures 4 and 5 are cross sectional views through the standard, taken substantially along planes as indicated by the lines 4—4 and 5—5, respectively, of Figure 2;

Figure 6 is an enlarged horizontal sectional view, taken substantially along the line 6—6 of Figure 2, and Figure 7 is a diagrammatic view illustrating one electric circuit adaptable for use with the magnetic control.

Referring more specifically to the drawings, a portion of a corn planter, designated generally 10, is illustrated in Figure 1, including a portion of a seed box 11, and a portion of a fertilizer box or hopper 12. A standard 13 extends downwardly from the bottom of the seed box 11. The standard 13 includes a front wall 14 and spaced substantially parallel side walls 15, and has an open rear side. The front portion of the lower end of the standard is enlarged by being forwardly offset, as seen at 16. The standard 13 has an open bottom 17 which opens into a hollow downwardly opening heel 18 from the forward end of which projects a runner 19. A tube 20 communicates with the bottom of the fertilizer hopper 12 and extends downwardly therefrom and has its lower end opening into the top portion of a hollow boot 21 which is disposed directly behind the hollow heel 18.

The magnetic control unit in its entirety is designated generally 22 and includes a casing, designated generally 23, formed of two rearwardly opening channel shape members 24 and 25. The channel shape member 24 is substantially larger than the channel shape member 25 and includes a front wall 26 and substantially parallel rearwardly extending side walls 27. Said larger front channel member 24 has a forwardly offset lower portion 28 which is provided with a downwardly and rearwardly inclined bottom 29. The smaller rear channel member 25 includes an inner or front wall 30 and substantially parallel side walls 31. The side walls 31 are spaced apart a distance to fit snugly between the walls 27 and said rear channel member 25 is disposed between the rear portions of said walls 27 within the larger front channel 24. Fastenings 32, such as screws, extend outwardly through the walls 31 and are threadedly secured in the walls 27 for detachably mounting the rear channel 25 immovably in the rear portion of the front channel 24 and so that the wall 30 will cooperate with the wall 26 and portions of the walls 27 to form an elongated passage 33 having open upper and lower ends.

An elongated substantially rigid metal strip 34 is bent slightly at a point spaced from the ends thereof to provide substantially straight portions 35 and 36 which are disposed at an angle to one another somewhat less than 180°. The strip 34 on the outer side of the bend thereof is provided with aligned sleeve portions 37 through which a pivot pin 38 loosely extends. The ends of the pivot pin 38 seat in aligned openings 39 of the walls 27, as seen in Figure 3. Thus, the strip 34 is mounted in the upper portion of the channel or passage 33, and the portion 35 thereof extends upwardly from the pivot 38 and terminates in a rearwardly bent longitudinally curved terminal portion 40 forming a valve which extends rearwardly over the upper edge of the wall 30 and which is disposed for forward swinging movement to a position to close the open discharge end 41 of the seed hopper 11, as seen in dotted lines in Figure 2. The strip 34 is of a width to have a relatively close fitting engagement between the walls 27 and the lower portion 36 thereof forms a second or upper valve which is inclined downwardly and forwardly from the pivot 38, in one position of the strip 34, as seen in full lines in Figure 2, in which position the bottom edge of the valve 36 bears against a portion of the front wall 26. A compression spring 42 is mounted between a portion of the valve 36 and the wall 30 for normally retaining the lower end of the valve 36 against the wall 26 and in a closed position. An electromagnet 43 is mounted in an opening 44 of the wall 30 and is disposed between the pivot 38 and spring 42.

A substantially rigid elongated strip of metal 45 has an upper end portion 46 which is provided on a rear side thereof with aligned bearings 47, as best seen in Figure 3, which turnably engage a pin or shaft 48 which extends loosely therethrough and has its ends seated in openings 49 of the walls 27. A spring 50 is disposed between an intermediate portion of the strip 45 and the wall 30 and urges said strip to swing forwardly about its pivot 38 to position the bottom edge 51 of said strip over and substantially in contact with a portion of the inclined bottom 29, as seen in Figures 2 and 3. Said bottom portion of the strip 45 is provided with forwardly extending flanges or wings 52 which project from the side edges thereof and which fit relatively snug in the forwardly offset casing portion 28, as seen in Figure 6. The strip 45 functions with the bottom 29 to form the bottom valve of the magnetic control unit 25. A second electromagnet 53 is mounted in an opening 54 of the wall 30, between the pivot 48 and the spring 50.

A substantially rigid elongated metal strip 55 has transversely aligned bearings 56 located on a forward side of an upper end thereof and through which a pivot pin 57 loosely extends. The ends of the pivot pin 57 are mounted in the walls 31, in the same manner that the ends of the pivot pins 38 and 48 are mounted in the walls 27. The strip 55 extends downwardly and rearwardly through the rearwardly opening channel 25 and has a rearwardly turned lower end 58 forming a valve which extends rearwardly through a slot 59 into and across the fertilizer discharge tube 20, for closing said tube, above and adjacent the boot 21, when the strip 55 is maintained in the position as seen in Figure 2 by a compression spring 60. The spring 60 is disposed between an intermediate portion of the strip 55 and the wall 30, and is located beneath the electromagnet 53, which constitutes a double ended magnet, for a purpose which will hereinafter be described.

The magnetic control unit 23, assembled as heretofore described, can be inserted through the open back of the standard 13 and secured therein by nut and bolt fastenings 61 which extend through the walls 15, 27 and 31, as seen in Figures 4 and 5. The tube 20 is secured to the standard 13 by strap members 62 which are secured to opposite sides of said tube 20 by fastenings 63, and which strap members 62 are secured to the standard by certain of the fastenings 61.

Figure 7 illustrates an electric circuit which may be utilized with the magnetic control unit 23, including a current source such as a storage battery 64, a wiring circuit 65 connected to the positive and negative terminals of the current source 64, in which the electromagnets 43 and 53 are connected in parallel, and in which electric circuit a switch 66 is interposed. The switch 66 constitutes a normally open switch and includes a stationary contact 67 and a resilient leaf type spring contact 68 which is normally spring biased away from and out of contact with the contact 67 for breaking the electric circuit to the electromagnets 43 and 53. Any suitable means may be utilized for intermittently closing the switch 66. For example, an eccentric 69 fixed to a shaft 70 may be disposed to engage and momentarily move the resilient switch element 68 into engagement with the contact 67 on each revolution of the shaft 70. The shaft 70 may be driven from any rotary driven part of the seed planter 10 by means of which the opening and closing of the switch 66 can be synchronized with the movement of the planter 10 so that the electromagnets 43 and 53 will be energized each time that the planter 10 travels a predetermined distance.

From the foregoing it will be readily apparent that seed 71 which is discharged by gravity through the outlet 41 of the seed box 11 will drop down through the passage 33 and be collected by the intermediate valve 36, when said valve is in a closed position as seen in full lines in Figure 2. After the planter has travelled a predetermined distance, the switch 66 will be momentarily closed by movement of the eccentric 69 to its dotted line position of Figure 7. When this occurs, the electromagnets 43 and 53 will be simultaneously energized for swinging the strips 34 and 45 to their dotted line positions of Figure 2 whereby the intermediate valve 36 and lower valve 51 will be opened. A group of seeds 71 which is supported in the bottom 29, and which reached said bottom the previous time that the valves were opened, will be discharged by gravity off of the bottom rear edge of the bottom 29 to drop through the hollow heel 18 into the furrow which is being opened by the runner 19. At the same time, the group of seeds previously collected by the valve 36 will be released to drop downwardly through the passage 33. Before the seed released by the valve 36 reaches the lower end of the passage 33, the switch 66 will have resumed an open position and the electromagnets 43 and 53 will be de-energized so that the compressed springs 42 and 50 will quickly return the valves 36 and 51 to their closed positions. Thus, the group of seeds released by the upper valve 36 will be collected on the bottom 29 to be discharged by gravity the next time that the valves are opened. Also, when the upper and bottom valves are swung to their open dotted line positions of Figure 2, the shutoff valve 40 will be moved to its closed dotted line position for closing the seed box outlet 41 while the other valves are open so that any seed passing downwardly to the outlet 41 will be collected therein, so that said seeds will not be released into the passage 33 until the seeds can be collected by the closed valve 36. As previously stated, the electromagnet 53 constitutes a double-ended magnet. Each time that said electromagnet is energized for opening the bottom valve 51, it will also attract the strip 55 to cause said strip to swing inwardly or forwardly toward its dotted line position of Figure 2 whereby the valve portion 58 thereof is swung forwardly to an open position relative to the tube 20 so that fertilizer collected above the valve 58 may drop downwardly through the boot 21 into the furrow and in close adjacency to the group of seeds dropped at the same time. The boot 21 may be provided with the usual divider 72 by means of which the fertilizer, not shown, is deflected laterally of said boot in both directions.

From the foregoing it will become apparent that a unit of extremely simple construction has been provided for controlling the discharge of seed from a planter and by means of which the seed or kernels 71 can be grouped and discharged in groups to form hills, as for example, in planting corn. Additionally, it will be apparent that the seed control unit is of extremely simple construction involving a minimum number of parts and requiring no complicated mechanical linkages to effect the operation thereof.

Various modifications and changes are contemplated and may be resorted to, without departing from the function or scope of the invention as hereinafter defined by the appended claims.

I claim as my invention:

1. A magnetically controlled seed planter comprising a seed box having a downwardly opening outlet, a casing having a substantially vertical passage extending longitudinally therethrough including an upper end disposed beneath and communicating with the seed box outlet and an open lower discharge end, means supporting said casing beneath the seed box, an upper valve and a lower valve disposed in said passage in longitudinally spaced relation to one another, means supported by said casing and pivotally supporting said valves for swinging movement in the passage, springs bearing against said valves and engaging parts of said casing for normally retaining the valves in closed positions against portions of the casing, electromagnets supported by said casing for attracting the valves when the electromagnets are energized for swingably moving the valves to open positions out of engagement with said casing portions, means for intermittently closing an electric circuit for simultaneously energizing said magnets momentarily for releasing the seeds collected by the valves and said casing portions for discharge downwardly by gravity through the passage, said upper valve and the casing portion engaged thereby being disposed for collecting seeds discharged from the seed box into the upper end of the passage and the lower valve and casing portion engaged thereby being disposed to collect seeds near the lower end of the passage for discharge from the casing when the valves are moved to open positions, a shutoff valve forming an extension of said upper valve and disposed for movement simultaneously therewith, and said shutoff valve being swingably movable into a position for closing the seed box outlet when the upper valve is moved to an open position and being disposed in an open position when the upper valve is in a closed position.

2. A magnetically controlled seed planter comprising a seed box having a downwardly opening outlet, a casing having a substantially vertical passage extending longitudinally therethrough including an upper end disposed beneath and communicating with the seed box outlet and an open lower discharge end, means supporting said casing beneath the seed box, an upper valve and a lower valve disposed in said passage in longitudinally spaced relation to one another, means supported by said casing and pivotally supporting said valves for swinging movement in the passage, springs bearing against said valves and engaging parts of said casing for normally retaining the valves in closed positions against portions of the casing, electromagnets supported by said casing for attracting the valves when the electromagnets are energized for swingably moving the valves to open positions out of engagement with said casing portions, means for intermittently closing an electric circuit for simultaneously energizing said magnets momentarily for releasing the seeds collected by the valves and said casing portions for discharge downwardly by gravity through the passage, said upper valve and the casing portion engaged thereby being disposed for collecting seeds discharged from the seed box into the upper end of the passage and the lower valve and casing portion engaged thereby being disposed to collect seeds near the lower end of the passage for discharge from the casing when the valves are moved to open positions, a fertilizer discharge tube located behind and adjacent said casing, a third valve swingably supported by and disposed externally of the casing and having a portion disposed in and closing the fertilizer discharge tube when the third valve is in a closed position, and spring means urging said third valve to a closed position, said third valve being disposed to be attracted by the electromagnet of said lower valve whereby the third valve is moved to an open position simultaneously with said upper and lower valves.

References Cited in the file of this patent

UNITED STATES PATENTS

| | | |
|---|---|---|
| 1,406,125 | Wester | Feb. 7, 1922 |
| 1,635,220 | Palmer | July 12, 1927 |
| 1,851,196 | Lewis | Mar. 29, 1932 |
| 2,376,304 | Anderson | May 15, 1945 |
| 2,529,457 | Nilsson | Nov. 7, 1950 |
| 2,677,339 | Armstrong et al. | May 4, 1954 |
| 2,701,538 | Erwin | Feb. 8, 1955 |
| 2,726,019 | Moran | Dec. 6, 1955 |
| 2,782,962 | Mercer | Feb. 26, 1957 |
| 2,787,404 | Vandenberg et al. | Apr. 2, 1957 |